United States Patent [19]

Jankowski, Jr.

[11] 3,963,226

[45] June 15, 1976

[54] REFUSE CONTAINER EDGE PROTECTOR

[76] Inventor: John J. Jankowski, Jr., 2511 N. Richmond St., Chicago, Ill. 60647

[22] Filed: Nov. 11, 1974

[21] Appl. No.: 522,587

[52] U.S. Cl. .......................... 267/116; 248/358 AA; 248/DIG. 7; 220/85 K; 206/521; 220/69; 267/152

[51] Int. Cl.² ..................... B65D 7/42; B65D 25/26; F16F 3/07; F16F 3/10

[58] Field of Search ............. 220/69, 85 K; 248/350, 248/358 R, 358 AA, DIG. 7; 267/116

[56] References Cited

UNITED STATES PATENTS

| | | | |
|---|---|---|---|
| 2,154,275 | 4/1939 | Linn | 248/358 AA |
| 2,655,370 | 10/1953 | Schulze | 248/358 AA |
| 2,841,388 | 7/1958 | Hehn | 248/358 AA |
| 3,268,199 | 8/1966 | Kordyban et al. | 220/69 |

FOREIGN PATENTS OR APPLICATIONS

| | | | |
|---|---|---|---|
| 1,149,257 | 7/1957 | France | 220/69 |

*Primary Examiner*—William Price
*Assistant Examiner*—Joseph M. Moy
*Attorney, Agent, or Firm*—John J. Kowalik

[57] ABSTRACT

A protector for the bottom edge of a refuse can comprising a band of elastomer material formed into an annulus which is sleeved over the bottom chime of a refuse can. The band is molded about a steel coil spring which forms an annular passage within the band. The passage communicates with partially closed radial ports formed band. The spring is adapted to underlie the chime and by the coils of the spring deflecting axially serves as a shock absorbing means when the container is dropped. Also, air is compressed within the passage and spurts through the leaky ports. This augments the action of the spring and absorbs the rim crushing blows.

10 Claims, 6 Drawing Figures

REFUSE CONTAINER EDGE PROTECTOR

DISCUSSION OF THE PRIOR ART

Prior art devices have utilized various protective edgings for containers. These essentially are solid rubber or other elastomer material such as vinyl, polypropylene, neoprene, etc. These substances, while temporarily protecting the edging of large drums such as converted 55 gallon oil drums, transmit the drop shocks directly to the base and particularly to the vulnerable bottom edge when the container is dropped diagonally from excessive heights such as when thrown by a garbage collector after he empties the can. No simple, effective and durable means has been heretofore provided which is easy to produce and apply to such containers.

SUMMARY OF THE INVENTION

This invention is directed to a device for protecting the bottom edge of a can which in addition to being resilient provides a novel arrangement of compression and air springs which function to absorb the bounce shock imposed on a can when dropped.

The invention comprehends the provision of an elastic annulus which incorporates air bleed ports for an air spring formed within the annulus, the air spring being in the form of a cylindrical passage formed within the annulus.

The invention contemplates lining the chamber within the annulus with a spring coil coaxial with the axis of the chamber which extends circumferentially about the axis of the container to which the annulus is attached, the spring coils being deflectible axially of the drum and not only reinforcing the elastomer material but also functioning as a spring resistance.

These and other objects and advantages inherent in and encompassed by the invention will become more readily apparent from the specifications and the drawings, wherein.

DESCRIPTION OF THE INVENTION

Figure 1:
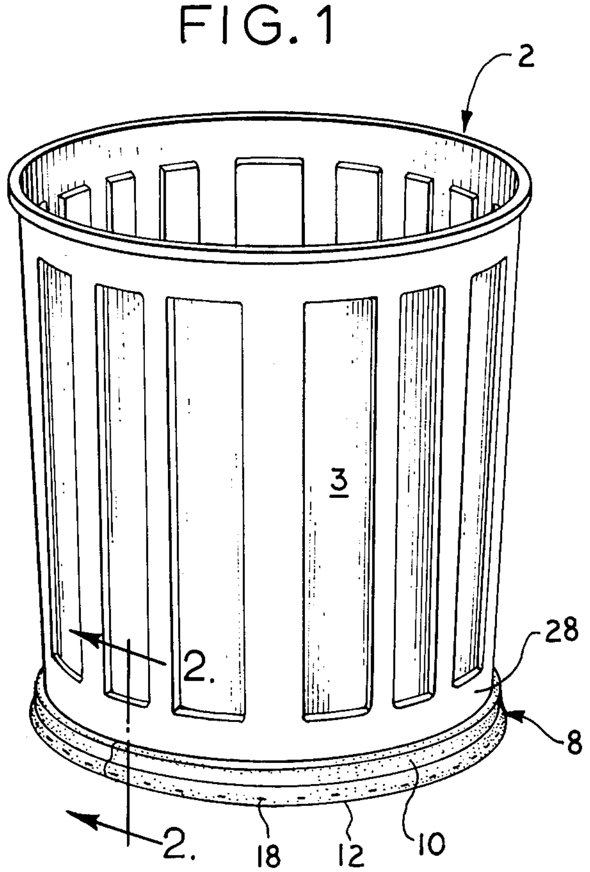
FIG. 1 is a perspective view of a drum incorporating the novel invention.
Figure 2:
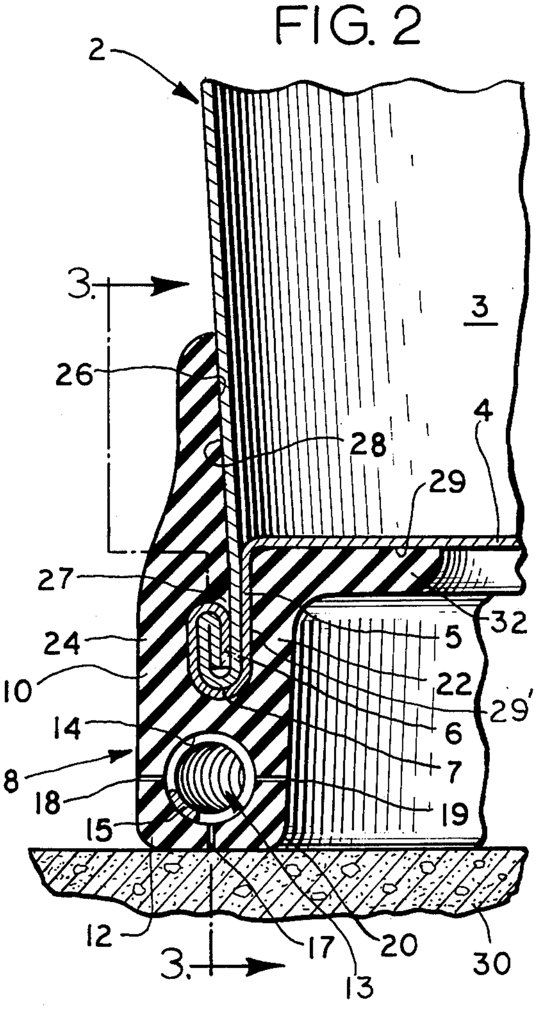
FIG. 2 is an enlarged fragmentary sectional view taken substantially on line 2—2 of FIG. 1.
Figure 3:
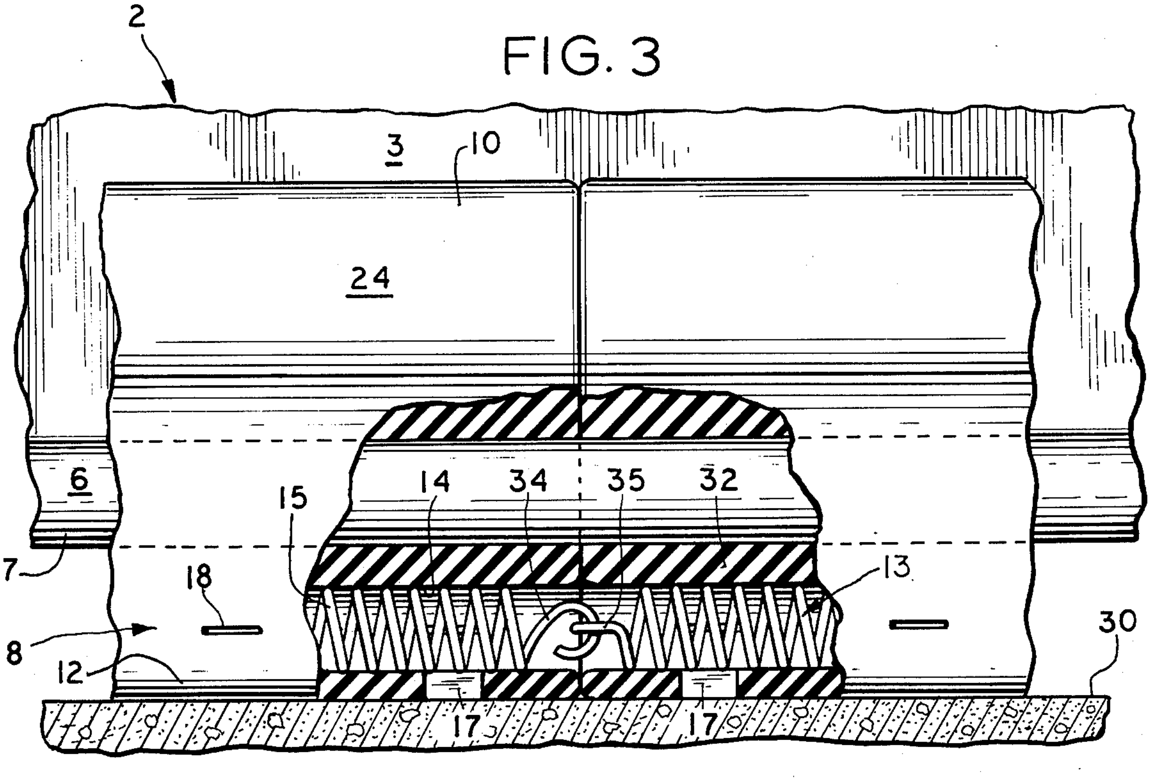
FIG. 3 is a fragmentary sectional view taken substantially on line 3—3 of FIG. 2.

The invention is shown applied to a large metal drum 2 which has a cylindrical body 3 which at its lower end has an end panel or bottom 4 provided with a chuck wall 5. The wall 5 is fitted within the lower portion of the body 3 and is either double seamed or weld-connected thereto and forms a chime 6 with a bead 7 along the lower edge.

An edge protector, generally designated 8, is mounted on the chime and comprises an annular flexible element 10 having a body or base portion 12 in which there is formed an air spring 13 comprising chamber 14. The chamber 14 is disposed in axial alignment with the chime or edging and is of a diameter substantially larger than the edging. The chamber 14 encircles the axis of the drum and is of tubular preferably cylindrical cross-section, and is coaxial with a wire spring 15 which is molded or fitted into the periphery of the chamber to form a composite spring structure therewith.

The air chamber 14 is provided with a plurality of partially closed ports 17, 18 and 19 extending from the chamber through the periphery 20 of the body portion of the annulus.

The body portion is integrally formed at its upper side with a pair of radially spaced concentric inner and outer bands 22, 24 which define a vertical chime-admitting slot 26 therebetween into which the edging 6 is inserted. The slot has an enlarged lower portion 27 for snapping the bead therein to secure the protector to the container.

The outer band is stretched over the outer surface 28 of the container and the inner band 22 engages the inner face 29' of the chuck wall. Band 22 terminates at the bottom side 29 of the bottom panel and is connected to a radially inwardly extending flange 32.

The novel edge protector is formed as a single length and is held together by hooking the hook ends 34,35 of the spring. The spring being in tension will provide a hoop stress against the container.

In applying the edge protector, it may be partly fitted onto the edge while the spring is held extended and the spring may then be hooked together and the corresponding end portions of the protector fitted onto the edge. The spring may also be connected together to form a ring and the annulus then may be forced over the bottom of the edging.

In operation when the container 2 is dropped, the body or base portion of the protective ring will strike the pavement 30. The body portion is deformed thereby compressing and collapsing the adjacent portion of the air filled chamber which causes the gas (air) to spurt out from the various ports 17–19. At the same time the coils of the spring in proximity to the area of the blow will deflect transaxially of the spring. The deflection of the coils and collapse of the air spring both absorb the impact shock loads imposed and after absorbing the shock recover their original shape since the spring and the plastic, which preferably is a polymer resin, or rubber are resilient. Some compression of the material also occurs.

Figure 4:
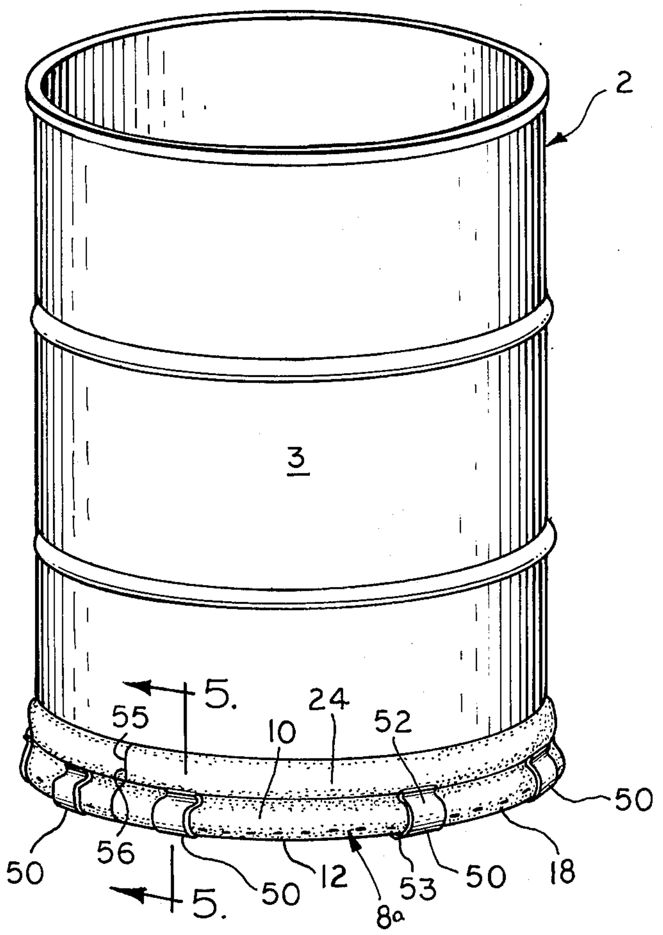
FIG. 4 is a perspective view of another embodiment of the invention.
Figure 5:
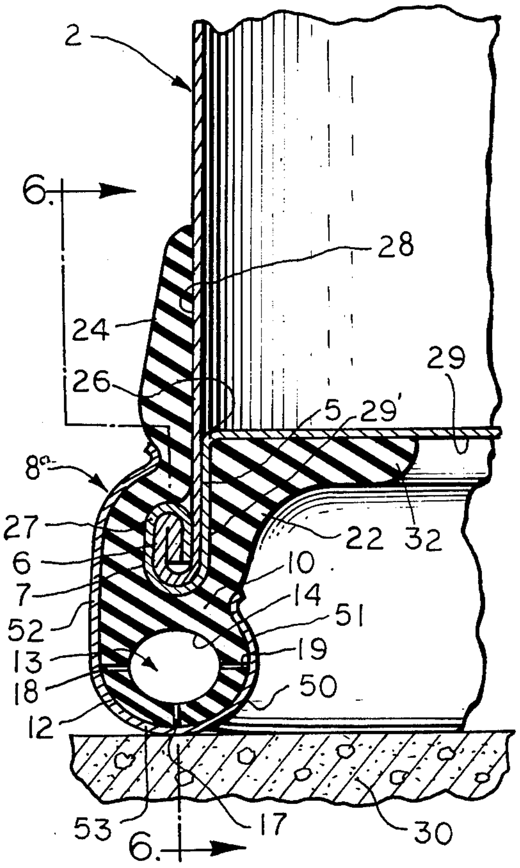
FIG. 5 is an enlarged cross-section on line 5—5 of FIG. 4.
Figure 6:
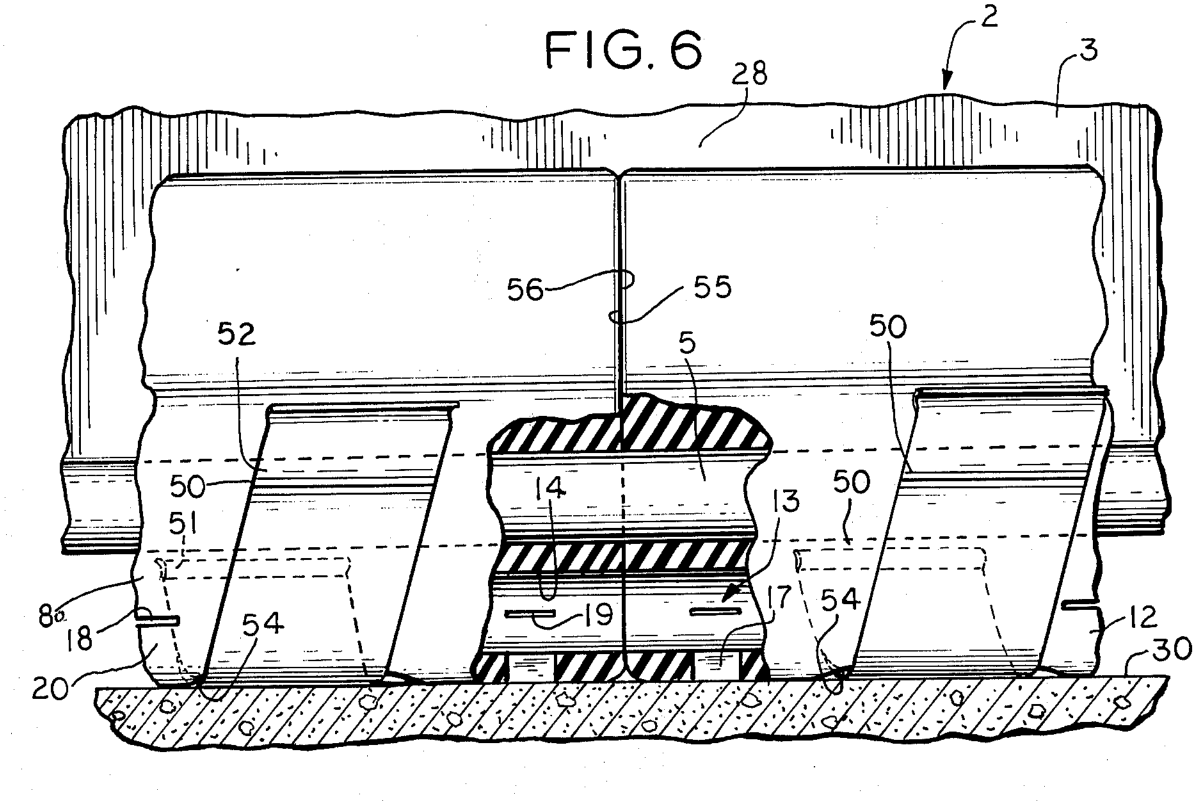
FIG. 6 is a fragmentary side elevation partly in section taken on line 6—6 of FIG. 5.

Embodiment of FIGS. 4–6

In this modification parts similar to the previous embodiment are identified by corresponding reference numerals. The container 2 has a body 3 and a bottom panel 4 connected to the body preferably by a chime 5.

The edge protector 8*a* is almost identical with the edge protector 8 except for minor difference in shape. It fits over the edge or chime and the air spring structure 13 is aligned with the bottom edge.

The principal difference of this embodiment over the previous one resides in providing torsion spring clips or spring means 50 of U-shape in cross-section and having a pair of upstanding legs 51 and 52 joined at their lower ends by a bight 53 which extends under the body portion 12 within notches 54 therein. The spring clip legs are offset circumferentially of the band and are biased toward each other and force the inner and outer bands 22,24 into tight embracing relation to the chime and bottom edge. When the drum is dropped onto the pavement 30 the springs are deflected and the legs slide upwardly opening up and the air spring is compressed exhausting air through ports 17, 18 and 19. When the impact load is terminated the springs extend out and the air spring expands drawing in the air through the ports 17, 18 and 19.

The ends 55,56 of the protector element may be joined together by a suitable adhesive prior to application to the drum or thereafter.

Having described a preferred embodiment of the invention, it will become apparent that other embodiments of the invention will now become readily apparent which fall within the scope of the appended claims.

I claim:

1. An edge protector for a container comprising an elastomer annulus adapted to fit about the lower edge of the container and having an air spring portion and a metal spring associated therewith, said springs disposed to operate conjunctively to absorb drop shocks imposed on the container, and said air spring comprising a tubular chamber formed in the annulus and partially-closed ports communicating the air chamber with the atmosphere.

2. The invention according to claim 1 and said metal spring comprising a coil spring oriented axially circumferentially of the annulus.

3. The invention according to claim 1 and said air spring comprising an annular chamber concentric within said annulus and said metal spring comprising a helical coil within said chamber concentric therewith.

4. The invention according to claim 1 and said annulus having a bottom body portion molded about said metal spring and having a pair of upstanding annular bands defining a chime-admitting slot therein.

5. The invention according to claim 4 and said annular bands being concentrically arranged and one of the bands comprising an inner band terminating in an upper edge, having thereon a radially inwardly extending bottom-panel-engaging flange.

6. The invention according to claim 1 and said air spring comprising a tubular annular chamber formed in said annulus concentric therewith, and said metal spring being disposed in supporting relation to the said air chamber to resist collapse thereof.

7. The invention according to claim 6 and said ports comprising air metering means communicating said chamber with the exterior.

8. The invention according to claim 7 and said metal spring comprising a plurality of closely spaced helical coils embedded into said elastomer annulus.

9. The invention according to claim 1 and said metal spring comprising clip means, each clip means being U-shaped and having opposing legs clamping said air spring portion therebetween.

10. An edge protector for a container bottom comprising a bottom edge portion, an elastomeric element having means for attachment to said edge portion and including an air spring formed in said element and combined exhaust and inlet means for air extending from said air spring to the atmosphere, and helical spring means arranged as a hoop within said air spring and having hook ends hooked to each other for holding said protector in assembled position.

* * * * *